Aug. 1, 1972 G. CAFIERO 3,681,172

STRIP FEEDING AND CUTTING MECHANISM

Filed April 22, 1970 5 Sheets-Sheet 1

INVENTOR
GASPER CAFIERO

BY James and Franklin
ATTORNEY

INVENTOR
GASPER CAFIERO

BY James and Franklin
ATTORNEY

INVENTOR
GASPER CAFIERO

BY James and Franklin
ATTORNEY

Aug. 1, 1972 G. CAFIERO 3,681,172

STRIP FEEDING AND CUTTING MECHANISM

Filed April 22, 1970 5 Sheets-Sheet 4

INVENTOR
GASPER CAFIERO
BY James and Franklin
ATTORNEY

STRIP FEEDING AND CUTTING MECHANISM

Filed April 22, 1970 5 Sheets-Sheet 5

INVENTOR
GASPER CAFIERO

BY James and Franklin
ATTORNEY 3,681,172
Patented Aug. 1, 1972

3,681,172

STRIP FEEDING AND CUTTING MECHANISM

Gasper Cafiero, Brooklyn, N.Y., assignor to Metra Electronics Corporation, Brooklyn, N.Y.

Filed Apr. 22, 1970, Ser. No. 30,664
Int. Cl. B31f *5/06;* G03d *15/04*
U.S. Cl. 156—506 24 Claims

ABSTRACT OF THE DISCLOSURE

Splicing apparatus comprising a strip feeding and cutting mechanism for use with a strip of adhesive tape wherein a segment of tape is fed, severed and affixed to the material to be spliced in one operation. The apparatus comprises a punch mechanism and means for automatically feeding a segment of tape to said punch mechanism in response to the plunger stroke thereof.

The present invention relates to a strip feeding and cutting apparatus and particularly to such apparatus designed for use in splicing magnetic tape.

One of the recent developments in commercial high fidelity sound recording is magnetic tape recording. Sound reproduction on magnetic tape has now been perfected sufficiently for such tapes to be competitive with standard disc recordings. Moreover, the advent of the multitrack tape cartridge wherein a lengthy recording may be impressed on several tracks of a single, relatively small endless strip of magnetic tape mounted in a small cartridge, has prompted a great surge in popularity in such tape recordings.

The final step in the manufacture of endless multitrack magnetic tape is the splicing of the two abutting tape ends together. For this purpose a small segment of splicing tape is affixed to both ends of the magnetic tape in contiguous relationship. The splicing tape commonly comprises an aluminum foil backing with a pressure sensitive adhesive coating thereon which is commonly available in strip form mounted on a roll.

The splicing process is an extremely delicate operation and must be done with great precision in order to produce an acceptable product. Thus the edges of the magnetic tape must be accurately positioned in abutting relationship, and a segment of adhesive tape of precise dimensions must be accurately spliced onto such abutting edges.

This process has in the past been accomplished manually. That is, while devices have been designed to accurately cut the adhesive tape into segments and to accurately maintain the position of the abutting edges of magnetic tape, the actual application of the adhesive tape for splicing has required a separate manual operation. The present invention provides apparatus which is designed to perform all three of the foregoing steps—cutting the adhesive tape, holding the magnetic tape and applying the adhesive tape—automatically in response to a single stroke of a plunger.

Accordingly, it is a primary object of the present invention to provide a mechanism for automatically feeding a strip of material to a cutting mechanism and severing a measured segment therefrom all in one operation.

It is a further object of the present invention to provide an apparatus which is adapted to perform a series of such feeding and cutting operations upon a roll of strip material, each cycle of operation requiring a single stroke of a plunger.

It is still a further object of the present invention to provide a mechanism for performing such incremental feeding and cutting on a strip of adhesive tape, means being provided for preventing the adhesive surface of the tape from adhering to the feed mechanism or the cutting surface.

It is yet another object of the present invention to design a splicing mechanism which provides for the feeding, cutting and affixing of a segment of adhesive strip material on the object to be spliced in a single rapid and accurate operation.

It is a still further object of the present invention to provide apparatus of the type described which is simply to operate, and easy and inexpensive to manufacture and maintain.

To the accomplishment of the above and to such other objects as may hereinafter appear, the present invention relates to a strip feeding and cutting apparatus as defined in the appended claims and as described in this specification in which:

Figure 1:
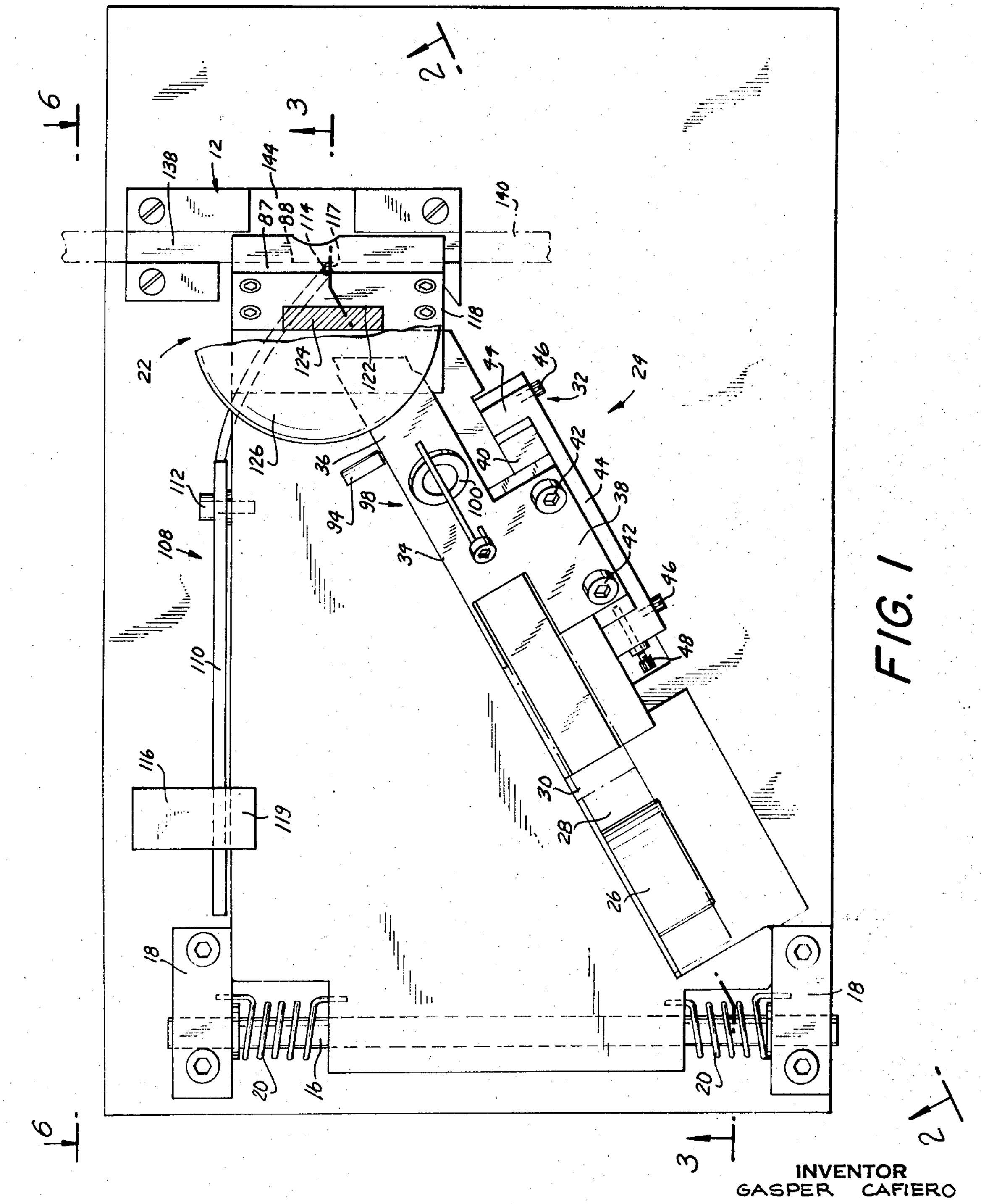
FIG. 1 is a top plan view of the apparatus showing the triangular shaped support plate pivotally mounted at one side on a base plate and mounting a punch mechanism at its apex.
Figure 2:
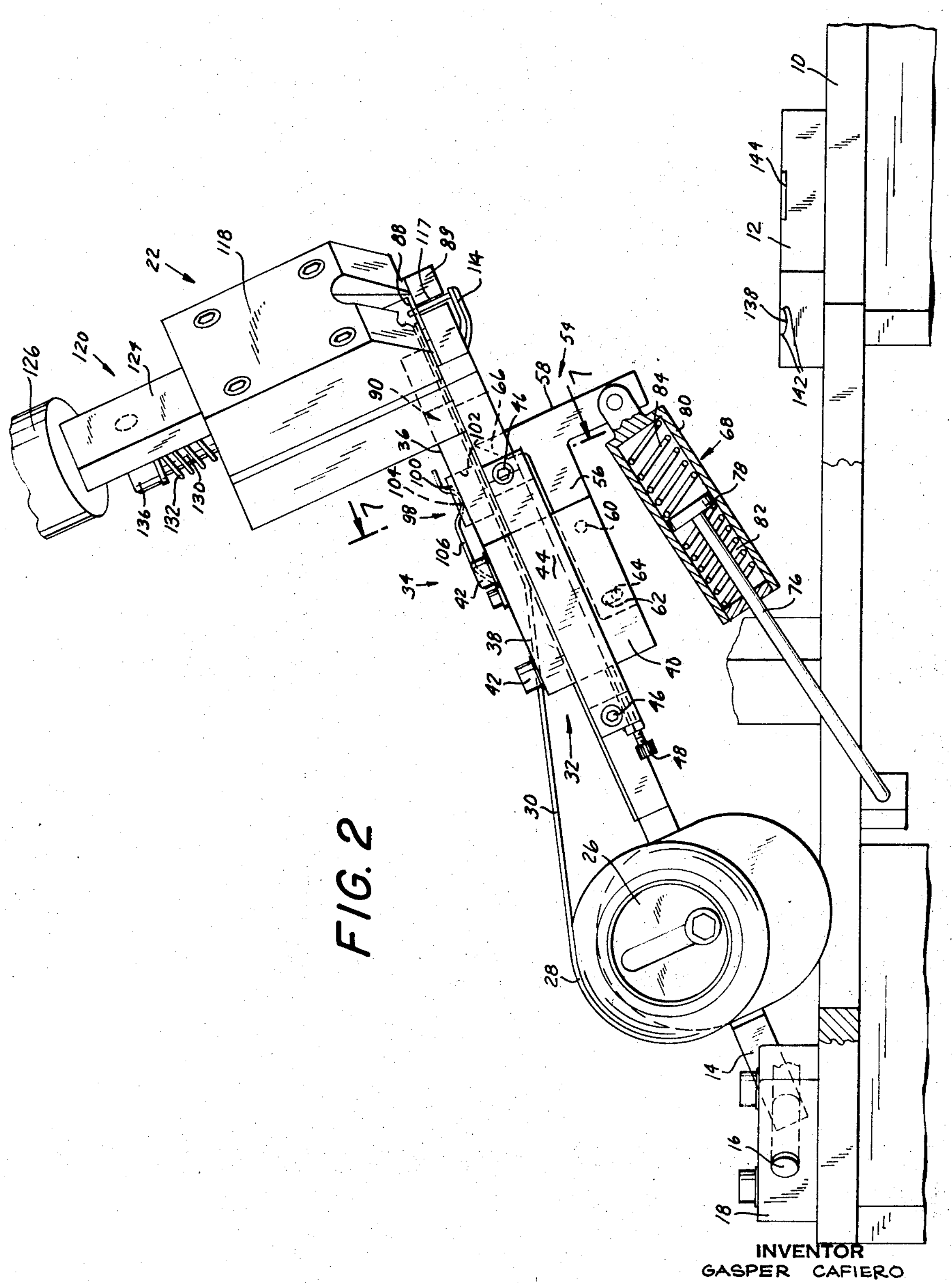
FIG. 2 is a side elevational view taken along the line 2—2 of FIG. 1.

As best illustrated in FIG. 2, the present apparatus comprises a base plate 10 having a splicing stage generally designated 12 fixedly mounted thereon at one end and having a support plate 14 pivotally mounted thereon at its other end. As shown in FIG. 1, plate 14 is generally in the shape of a right triangle and is pivotally mounted at one side thereof on a bar 16 mounted at either side on base plate 10 by means of brackets 18. Plate 14 is spring biased away from plate 10 by means of coil springs 20 mounted concentrically of bar 16 and each attached at one end to bracket 18 and at its other end to a recessed portion of plate 14. A punch mechanism generally designated 22 is mounted at the apex of triangular support plate 14 and in operation is adapted to operatively engage splicing stage 12.

Figure 7:
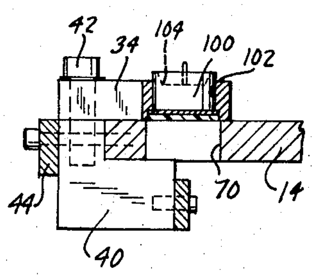
FIG. 7 is a cross-sectional view taken along the line 7—7 of FIG. 3.

A strip feeding mechanism generally designated 24 is mounted on triangular plate 14 along the hypotenuse thereof and is adapted to feed a strip of material incrementally to punch mechanism 22 for severing and affixing to the material to be spliced on stage 12. Strip feeding mechanism 24 comprises a cylindrical roll support 26 adapted to rotatably mount a roll of adhesive tape 28. A strip of tape 30 is adapted to be fed from said roll along arm 14 through a carriage generally designated 32 to a region directly below punch mechanism 22. Accordingly, carriage 32 is adapted to ride on arm 14 reciprocally toward and away from punch mechanism 22 to thus incrementally feed strip 30 along the upper surface of plate 14. Carriage 32 comprises a clamping plate 34 having an elongated feed portion 36 and base portion 38 overhanging the edge of arm 14 (FIG. 1). An L-shaped lower carriage member 40 is secured to the overhanging base portion 38 of clamping plate 34 by screws 42 and defines, together with clamping plate 34, a U-shaped channel slidably engaging the edge of plate 14 (FIG. 7). The thus constituted carriage means is retained on said plate 14 in slidable engagement by means of a long U-shaped friction member 44 secured to the side of plate 14 by screws 46 (FIG. 1).

As best shown in FIG. 1, friction member 44 cooperates with plate 14 to define a slot therebetween within which carriage member 32 is adapted to slidably reciprocate. The feed stroke (to the right as viewed in FIG. 1) of carriage member 32 is limited by one leg of member 44 and the return stroke is limited by an adjustable stop member comprising a set screw 48 threadingly secured in the other leg of friction member 44.

Figures 3, 4, 5:
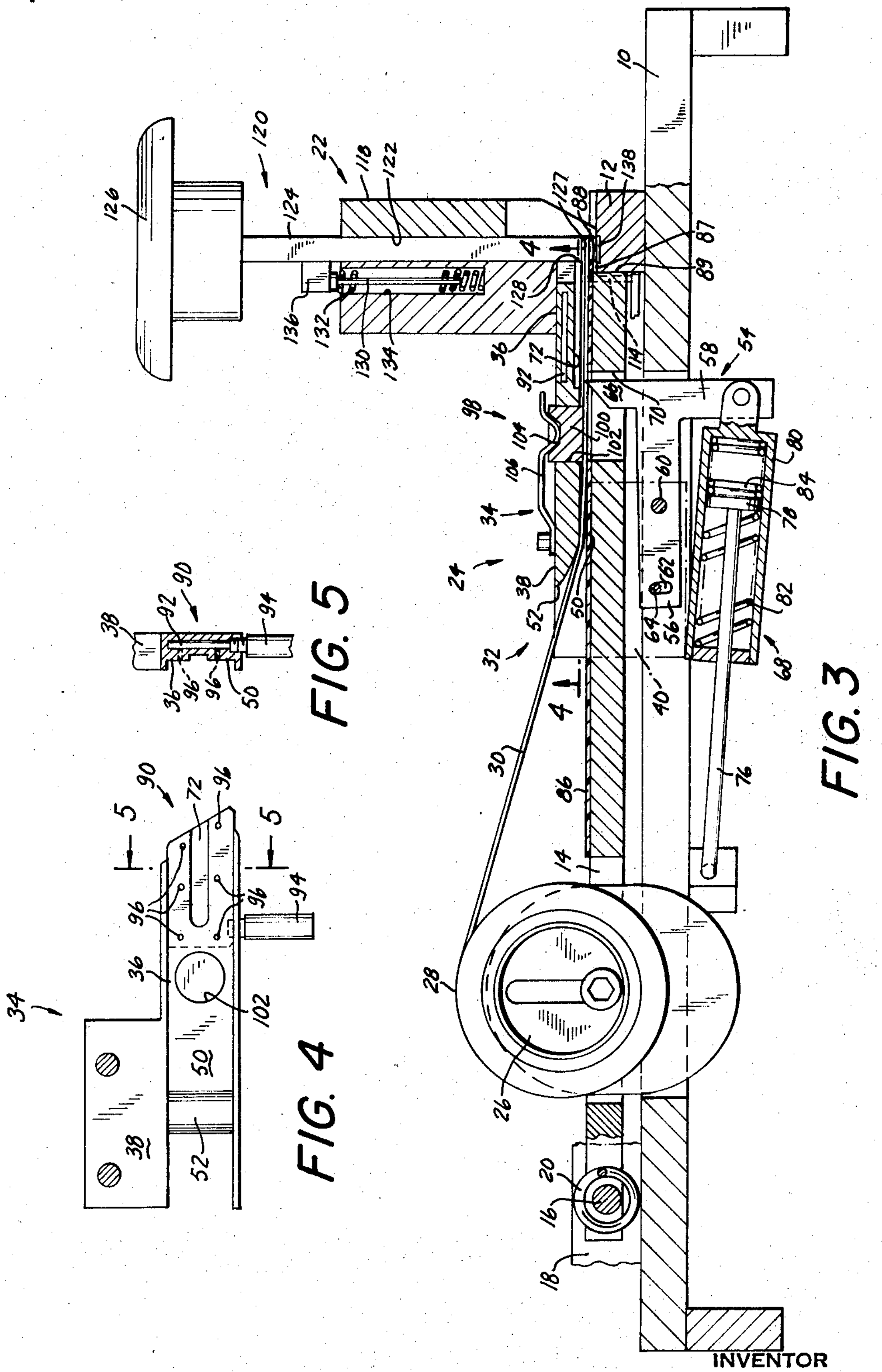
FIG. 3 is a cross-sectional view taken along the line 3—3 of FIG. 1.
FIG. 4 is a plan view of the strip feed plate taken along the line 4—4 of FIG. 3.
FIG. 5 is a cross-sectional view of the vacuum means associated with the strip feed plate taken along the line 5—5 of FIG. 4.

As best shown in FIGS. 4 and 5, feed portion 36 of clamping plate 34 is provided with an elongated groove 50 which, together with the upper surface of plate 14, defines a channel adapted to receive strip 30 as it is fed from roll 28 and guide it toward punch mechanism 22. Accordingly, the entrance end of groove 50 is recessed and provided with a chamfer 52 adapted to receive tape 30 at an angle to plate 14 (see FIG. 3).

As plate 14 is pivoted clockwise (as viewed in FIG. 2) toward base plate 10, strip 30 is adapted to be clamped to clamping plate 34 of carriage 32 which in turn is adapted to slide along plate 14 toward punch mechanism 22, thereby to feed said strip to said punch mechanism. For this purpose there is provided a hammer-shaped clamping member 54 comprising a handle portion 56 carrying a clamping pin 58 at one end. Handle portion 56 is pivotally mounted near its center on lower carriage member 40 of carriage 32 by means of pin 60 and is provided with a slot 62 at its other end adapted to operatively slidingly receive a pin 64 projecting from member 40, said slot being adapted to limit the rotation of clamping member 54 on pin 60. Clamping pin 58 is tapered at one end to form an operative clamping surface 66 and is pivotally secured at its other end to a compressible linkage member generally designated 68, the other end of which is pivotally mounted on base plate 10.

As best shown in FIGS. 3 and 7, support plate 14 is provided with a slot 70 (FIG. 7) underlying feed plate 34 and adapted to receive the operative clamping end 66 of clamping pin 54. Clamping pin 58 is normally biased clockwise (around pin 60) by linkage 68 as a result of the counterclockwise bias of support plate 14 by springs 20 (see FIG. 2). However, the clockwise rotation of clamping member 54 is limited by the engagement of the lower end of slot 62 on handle 56 with pin 64 on member 40. Thus, as shown in FIG. 2 the clamping surface 66 of clamping pin 58 is normally maintained slightly spaced from feed plate 34. As support plate 14 is pivoted clockwise on base plate 10, linkage 68 is adapted to urge clamping member 54 to pivot counterclockwise on pin 60, clamping surface 66 being urged toward feed plate 34 into operative clamping engagement with strip 30 against the surface of groove 50 in feed plate 34. In order to insure good clamping engagement, the surface of groove 50 is provided with a shallow slot 72 of approximately the width of clamping pin 58. As a result, the counterclockwise rotation of clamping member 54 produces a slight pinching action on strip 30 against slot 72 in groove 50.

In order to insure that clamping surface 66 bears against strip 30 with sufficient pressure to effectively clamp said strip to feed plate 34 and to prevent binding of linkage 68 during rotation of support plate 14, said linkage 68 is compressible and comprises a rod 76 pivotally mounted on base plate 10 at one end and carrying a piston 78 at its other end. Piston 78 and rod 76 are slidably mounted in a cylinder 80, piston 78 being urged in opposite directions by compression coil springs 82 and 84 respectively. Cylinder 80 is pivotally secured to the lower end of clamping pin 58 and is adapted to produce a torque on clamping member 54 around pin 60. The equilibrium position of piston 78 (i.e. in the absence of external tensile or compressive forces on the structure) is somewhere between the two extreme positions shown in FIGS. 2 and 3 respectively. Thus, in the unclamped position shown in FIG. 2 spring 82 is compressed by the counterclockwise bias on springs 20 on plate 14 and cylinder 80 pulls on clamping pin 58 (producing a clockwise torque on clamping member 54). In the clamped position illustrated in FIG. 3 spring 84 is compressed and cylinder 80 pushes on clamping pin 58 (producing a counterclockwise torque on clamping member 54). It will be apparent that since carriage 32 is slidable on support plate 14, the force exerted on clamping pin 58 will, in addition to providing a torque around pin 60, be transmitted through said pin and produce a translatory sliding motion of carriage 32 on support plate 14. Which of these two motions (rotation of clamping member 54 or translation of carriage 32) occurs first in response to the pivoting of support plate 14 will depend upon the degree of frictional resistance to such movement. Accordingly, friction member 44 is adapted to frictionally engage carriage 32 with sufficieit pressure to delay the movement of such carriage along support plate 14 until clamping member 58 has completed its counterclockwise rotation on low friction pin 60. Moreover, since linkage 68 is compressible carriage 32 will not begin its feed stroke in response to a clockwise rotation of support plate 14 until the force exerted by compression spring 84 on carriage 32 through cylinder 80 and clamping member 54 reaches a level sufficient to overcome the static friction between carriage 32 and the channel within which it is adapted to slide comprising friction member 44 and support plate 14.

Thus, friction member 44 and spring 84 may be designed to provide a sufficient delay to insure adequate clamping engagement between clamping pin 54 and strip 30 before initiation of the feed stroke of carriage 32.

The edge of plate 14 underlying punch mechanism 22 is formed in the shape of an inverted L adapted to snugly engage splicing stage 12. The overhanging upper portion 87 of said edge defines stationary cutting edge 88, and is adapted to engage the upper surface of stage 12. The lower vertical surface 89 of said inverted L-shaped edge is adapted to be disposed contiguous to the vertical wall of stage 12.

In order to facilitate the feeding of strip 30 and particularly to prevent the sticking of the adhesive surface of strip 30 to support plate 14, the upper surface of said support plate is provided with a coating or strip of low friction material 86 such as Teflon or the like underlying feed plate 36. It has been found, however, that coating 86 may be insufficient to prevent the sticking or binding of adhesive strip 30 at cutting edge 88 of support plate 14 as a result of the buildup of adhesive gum from repeated cutting strokes. Accordingly, feed plate 36 is provided with a vacuum means generally designated 90 adapted to suck strip 30 against the lower surface of groove 50 slightly spaced from plate 14 as it approaches the cutting edge 88 thereof. As best shown in FIGS. 4 and 5 vacuum means 90 comprises a vacuum chamber 92 formed in feed plate 36 and having a vacuum conduit 94 emanating therefrom and communicating with a source of vacuum or low pressure (not shown). A plurality of small apertures 96 are provided in the operative surface of groove 50 on either side of slot 70 communicating with vacuum chamber 92. As best seen in FIG. 3 chamber 92 and apertures 96 extend approximately from the region of clamping engagement of clamping pin 58 to the operative cutting edge of plate 14.

As previously described the return stroke of carriage 32 is delayed until strip 30 is unclamped so that strip 30 remains stationary on plate 14 in preparation for the next feed stroke. It has been found, however, that vacuum means 90 tends to carry strip 30 back to the left during its return stroke. To prevent this from happening a holddown means generally designated 98 is provided to counteract the effect of vacuum means 90. As best shown in FIG. 3 holdown means 98 comprises a button member 100 slidably received in an aperture 102 in feed plate 36. Button 100 is provided at its upper surface with a recess 104 receiving a resilient element 106 suitably secured to feed plate 36 and adapted to bias button 100 against strip 30. For reasons not fully understood the pressure of button 100 on strip 30 is sufficient to maintain strip 30 stationary on plate 14 during the return stroke of carriage 32 yet it does not interfere with the feeding of said strip along plate 14 during the feed stroke.

Figure 6:
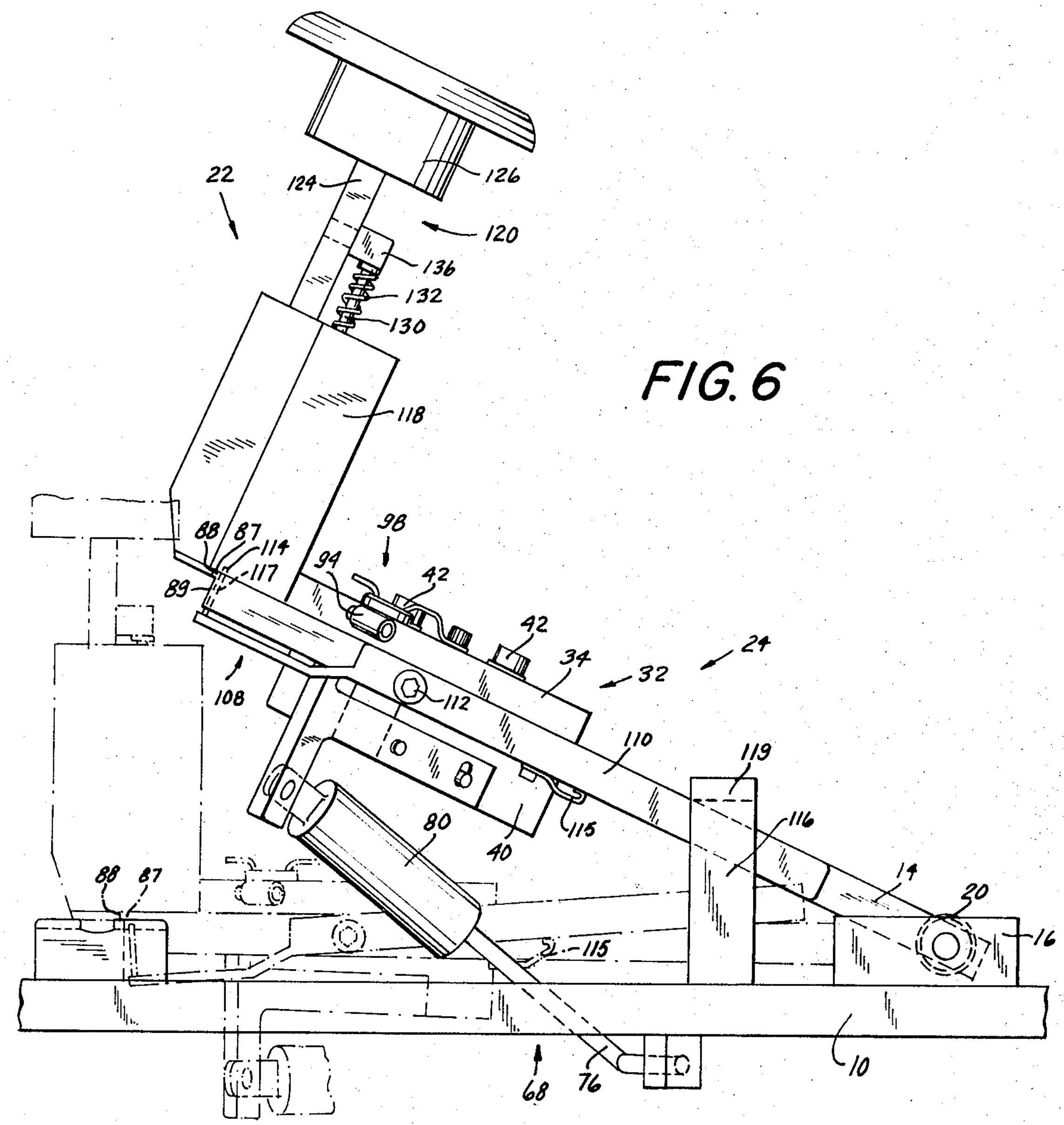
FIG. 6 is a side elevational view taken along the line 6—6 of FIG. 1.

One final difficulty is encountered as a result of the adhesive gum buildup on cutting edge 88. It has been found that the force of the cutting stroke tends to make the cut edge of strip 30 adhere to plate 14 at cutting edge 88. This effect is helpful in preventing tape 30 from being carried back to the left during the return stroke of carriage 32. However, it will produce binding and prevent the smooth feed of strip 30 beyond edge 88 during a subsequent feed stroke. Thus, the terminal edge of strip 30 must be freed from cutting edge 88 prior to a feed stroke. For this purpose a strip release mechanism generally designated 108 is provided. As best shown in FIG. 6 it comprises an arm 110 pivotally mounted on plate 14 by means of pin 112. One end of arm 110 carries a release pin 114 which is adapted to be received in an aperture 116 in the overhanging portion 87 and a recess 117 in the vertical surface 89 of plate 14 (FIG. 2). Arm 110 is biased counterclockwise by a resilient member 115 mounted on plate 14. In this biased position (broken line position of FIG. 6) release pin 114 remains below the plane of the upper surface of support plate 14. A stop member 116 is rigidly secured to base plate 10 and is provided with an extended portion 119 adapted to engage the upper surface of arm 110 and plate 14 (see FIG. 1). As plate 14 is released at the end of a cutting stroke, it is pivoted away from base plate 10 by springs 20. First arm 110 and then plate 14 will engage portion 119, the apparatus coming to rest in the solid line position of FIG. 6. It can be seen that in this position arm 110 has been pivoted clockwise against the bias of resilient member 115 so that pin 114 has pierced the plane of the upper surface of support plate 14 engaging strip 30. The terminal edge of strip 30 is thus released from cutting edge 88 of plate 14 and is free to be fed under punch mechanism 22 during the next stroke.

Punch mechanism 22 generally comprises a housing 118 and a plunger 120. Housing 118 is mounted on plate 14 and is provided with an elongated aperture 122 of rectangular cross-section. Plunger 120 comprises an elongated rectangular cutting tool 124 mounting a handle

126 at its upper end and having a flat horizontal surface 127 defining an operative cutting edge 128 at its lower end. Cutting tool 124 is slidably received within aperture 122, its cutting edge 128 being adapted to cooperate with fixed cutting edge 88 on support plate 14 to sever the portion of tape 30 overhanging edge 88. Plunger 120 is spring biased upwardly by the engagement of a cushioning rod 130 mounted on compression coil spring 132 within a recess 124 formed in housing 118, with a stop member 136 projecting from cutting tool 120. The spring constant of spring 132 is sufficiently stiff to delay the downward stroke of plunger 120 until after support plate 14 has pivoted into operative engagement with stage 12.

As best shown in FIGS. 1 and 2, stage 12 is provided with a concave groove 138 adapted to receive the two ends of the magnetic tape 140 to be spliced. The sides 142 of groove 138 are slightly inclined inwardly so that the tape 140 once pressed into said groove will be securely retained therein. A recess 144 extending laterally of groove 138 on stage 12 is provided to facilitate the centering of the two ends of tape 140 under cutting tool 124. Recess 144 is of a depth equal to the depth of groove 138 and thus is effective to eliminate said groove in the region directly beneath cutting tool 124. Thus the flat lower surface 127 of tool 124 is adapted to press the magnetic tape and the overlying adhesive splicing strip against the flat surface of recess 144.

Figure 8:
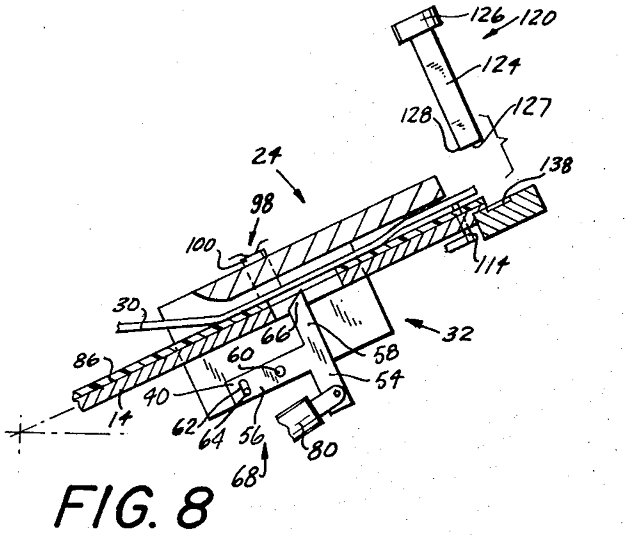
FIG. 8 is a schematic illustration of the carriage member and punch mechanism at the beginning of a strip feeding stroke.
Figure 8A:
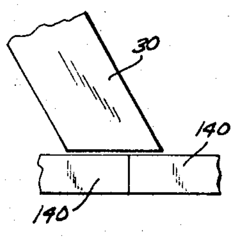
FIG. 8A is a schematic illustration of the two ends of the tape to be spliced showing the position of the splicing strip corresponding to FIG. 8.
Figure 9:
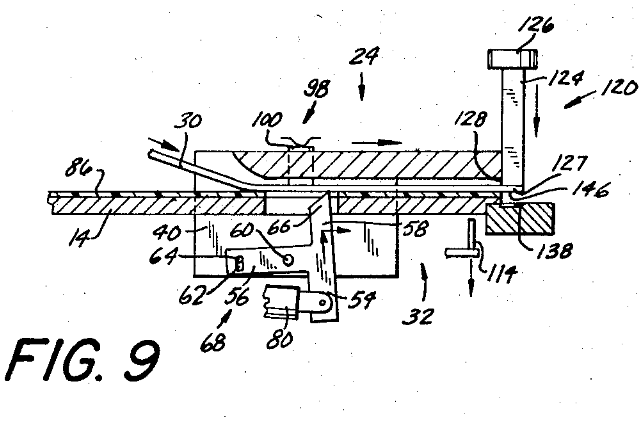
FIG. 9 is a schematic illustration similar to that of FIG. 8 showing the apparatus just prior to the cutting stroke.
Figure 9A:
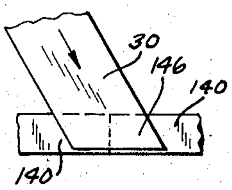
FIG. 9A is a schematic illustration of the tape and strip position similar to FIG. 8A corresponding to FIG. 9.
Figure 10:
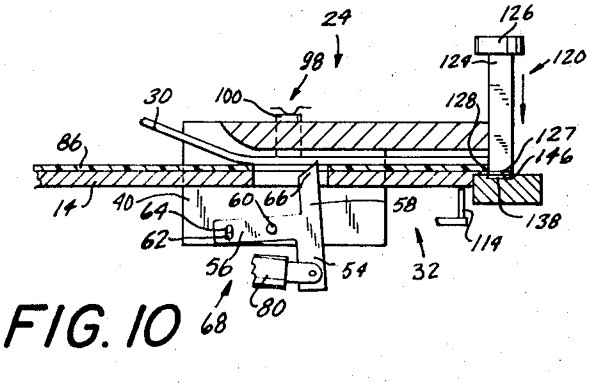
FIG. 10 is a schematic illustration similar to FIG. 8 showing the apparatus at the completion of the cutting stroke.
Figure 10A:
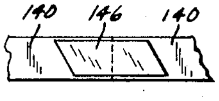
FIG. 10A is a schematic illustration of the tape and strip position similar to FIG. 8A corresponding to FIG. 10.

The operation of the present apparatus will now be apparent from a consideration of the schematic illustration of FIGS. 8–10A. The two ends of the magnetic tape 140 are secured in groove 138 on stage 12 in end to end abutting relationship under punch mechanism 22 (FIG. 8A). FIG. 8 shows the starting position of the apparatus. As the operator presses on handle 126, support plate 14 begins to pivot clockwise causing linkage 68 to urge clamping member 54 to pivot counterclockwise around pin 60 bringing the clamping surface 66 of clamping pin 58 into clamping engagement with strip 30. At the same time release pin 114 drops below the plane of the upper surface of support plate 14 as a result of the disengagement of arm 110 from stop member 116 (see FIG. 7). When the force exerted by linkage 68 on clamping member 54 is sufficient to overcome the frictional resistance of carriage 32 as a result of its engagement with friction member 44 and support plate 14, carriage 32 begins its feed stroke to right. Accordingly, a segment 146 of strip 30 is fed to a position overhanging cutting surface 88. The width of the strip segment 146 (dimension along the direction of feed) is, of course, defined by the feed stroke of carriage 32 and is preferably slightly less than the width of magnetic tape 140. During the pivoting of support plate 14 plunger 120 is maintained in its upward cocked position relative to plate 14 by the force of spring biased cushioning rod 130 against stop member 136. When the terminal edge of plate 14 operatively engages stage 12 the feed stroke is completed and cutting tool 124 begins its downward cutting stroke against the bias of spring 132 (FIG. 9). The strip segment 146 is cut from strip 30 by the engagement of cutting edge 128 on tool 124 and cutting edge 88 on support plate 14 in scissor fashion. The segment is then pressed against the upper surfaces of abutting tapes 140, the pressure sensitive adhesive surface of strip segment 146 firmly adhering to said tapes under the pressure of cutting tool 124 (FIGS. 10 and 10A).

As handle 126 is released by the operator spring 132 urges plunger 120 back to its cocked position and support plate 14 pivots counterclockwise under the influence of springs 20. The extension of linkage 68 causes cylinder 80 to pull on clamping member 54 pivoting said member on pin 60 out of clamping engagement with strip 30. The lower end of slot 62 on the handle portion 56 of clamping member 54 engages pin 64 on lower carriage member 40 stopping the clockwise rotation of clamping member 54. When the pull exerted by cylinder 80 on carriage 32 through clamping member 54 exceeds the frictional resistance of carriage 32 due to its engagement with friction member 44 and support plate 14, carriage 32 begins its return stroke, strip 30 remaining stationary on the upper surface of support plate 14. As support plate 14 comes to rest against portion 119 of stop member 116, bar 110 engages said portion 119 and is pivoted around pin 112 bringing release pin 114 up through aperture 116 in support plate 14 to release strip 30 from its adhesion to cutting edge 88 (FIG. 8). The apparatus is thus cocked and ready for another cycle.

The present invention provides a simple mechanical mechanism adapted to automatically perform a precision operation heretofore accomplished manually. By the single stroke of a plunger a precisely measured segment of pressure sensitive adhesive tape is cut from a roll and accurately spliced onto the abutting edges of a magnetic tape. The mechanism is designed to positively grip the adhesive tape and feed it along a support plate to the splicing punch yet maintain the tape stationary during the return stroke of the feed carriage. By coating the surface of the support plate with a low friction material such as Teflon, the adhesive surface of the tape is prevented from sticking or binding during the feed stroke. The adhesion of the tape to the stationary cutting edge of the support plate is obviated by a simple mechanism effective to free the tape from such edge prior to the next feed stroke. Proper sequence of operation is insured by providing bias springs of appropriate stiffness and incorporating structure adapted to provide frictional resistance to delay the movement of the feed carriage until after the strip is clamped. The mechanism is easy to construct and simple to use.

It should be noted that the provision for cutting the adhesive tape in the form of a parallelogram and affixing it on to the magnetic tape with the sides thereof spanning the magnetic tape at an angle provides an improved splice since the edge of the tape passes the recording and playback heads in a gradual fashion rather than all at once as would be the case with a rectangular splice segment.

While only one embodiment of the present invention has been here specifically disclosed, it will be apparent that many variations may be made therein all within the scope of the instant invention as defined in the following claims.

I claim:

1. A strip feeding and cutting apparatus for cutting a strip of material into segments comprising a frame, a support pivotally mounted, at one end on said frame and having a punch mechanism mounted on its other end, carriage means slidably mounted on said support, strip clamping means for clamping said strip to said carriage means operatively connected to said carriage means, and means operatively connected to said frame and said support and responsive to the pivoting of said support on said frame for sequentially moving said strip clamping means into clamping engagement with said strip and sliding said carriage along said support toward said punch mechanism, whereby a predetermined segment of said strip is fed to said punch mechanism.

2. The strip feeding and cutting apparatus of claim 1, wherein said strip clamping means comprises a clamping member pivotally mounted on said carriage and adapted to pivot into clamping engagement with said strip, whereby said strip is clamped between said clamping member and a portion of said carriage.

3. The strip feeding and cutting apparatus of claim 2, further comprising a part operatively pivotally connected at one end to said frame and at its other end to said clamping member, whereby upon the pivoting of said support relative to said frame said part pivots said clamping member relative to said carriage into clamping engagement with said strip.

4. The strip feeding and cutting apparatus of claim 3, wherein said part comprises a resilient means.

5. The strip feeding and cutting apparatus of claim 4, wherein said resilient means comprises a piston-cylinder assembly.

6. The strip feeding and cutting apparatus of claim 1, further comprising means for stopping the travel of said carriage along said support toward such punch mechanism.

7. The strip feeding and cutting apparatus of claim 2, further comprising means for stopping the travel of said carriage along said support toward such punch mechanism.

8. The strip feeding and cutting apparatus of claim 1, further comprising means for delaying the travel of said carriage toward said punch mechanism until said clamping means is brought into clamping engagement with said strip.

9. The strip feeding and cutting apparatus of claim 2, further comprising means for delaying the travel of said carriage toward said punch mechanism until said clamping member is brought into clamping engagement with said strip.

10. The strip feeding and cutting apparatus of claim 4, further comprising means for delaying the travel of said carriage toward said punch mechanism until said clamping member is brought into clamping engagement with said strip.

11. The strip feeding and cutting apparatus of claim 8 wherein said delaying means comprises friction means connected to said support and adapted to frictionally engage said carriage means.

12. The strip feeding and cutting apparatus of claim 9 wherein said delaying means comprises friction means connected to said support and adapted to frictionally engage said carriage means.

13. The strip feeding and cutting apparatus of claim 10 wherein said delaying means comprises friction means connected to said support and adapted to frictionally engage said carriage means.

14. The strip feeding and cutting apparatus of claim 1, further comprising resilient means for biasing said support away from said frame.

15. The strip feeding and cutting apparatus of claim 3, further comprising resilient means for biasing said support away from said frame.

16. The strip feeding and cutting apparatus of claim 1 further comprising vacuum means on said carriage means for urging said strip against said carriage means.

17. The strip feeding and cutting apparatus of claim 3 further comprising vacuum means on said carriage means for urging said strip against said carriage means.

18. The strip feeding and cutting apparatus of claim 1, wherein said strip is a pressure sensitive adhesive tape, and further comprising a Teflon coating on said support underlying said strip to facilitate the sliding of said strip along said support.

19. The strip feeding and cutting apparatus of claim 3, wherein said strip is a pressure sensitive adhesive tape, and further comprising a Teflon coating on said support underlying said strip to facilitate the sliding of said strip along said support.

20. The strip feeding and cutting apparatus of claim 1, wherein said strip is a pressure-sensitive adhesive tape, and further comprising means for lifting said strip from said support in the region of said punch mechanism in response to the pivoting of said support away from said frame.

21. The strip feeding and cutting apparatus of claim 1 wherein said punch mechanism comprises a cutting tool slidably mounted on said support and adapted to cooperate with a cutting edge on said support said cutting tool being spring-biased away from said cutting edge on said support.

22. The strip feeding and cutting apparatus of claim 21, wherein said strip is a pressure-sensitive adhesive tape, and further comprising means for lifting said strip from said support in the region of said punch mechanism in response to the pivoting on said support away from said frame.

23. The strip feeding and cutting apparatus of claim 21, wherein said strip is a pressure-sensitive adhesive tape, further comprising a stage mounted on said frame, means on said stage for holdingly engaging two strips of material in end-to-end abutting relationship and means on said cutting tool for pressing said tape onto said strip material in splicing engagement.

24. The strip feeding and cutting apparatus of claim 23, wherein said means for holdingly engaging said strip material comprises a concave groove on said stage, said groove having inwardly inclined side walls.

References Cited

UNITED STATES PATENTS

| | | | |
|---|---|---|---|
| 3,537,940 | 11/1970 | Nagano | 156—506 X |
| 3,533,885 | 10/1970 | Gustafson | 156—505 |
| 3,167,466 | 1/1965 | Lapersonne | 156—505 |

BENJAMIN A. BORCHELT, Primary Examiner

J. J. DEVITT, Assistant Examiner

U.S. Cl. X.R.

156—508